United States Patent [19]

Schumacher et al.

[11] 4,456,810
[45] Jun. 26, 1984

[54] ADAPTIVE SCHEDULE SELECTIVE WELD CONTROL

[75] Inventors: Berthold W. Schumacher; Walter Dilay, both of Dearborn, Mich.

[73] Assignee: Ford Motor Company, Dearborn, Mich.

[21] Appl. No.: 362,802

[22] Filed: Mar. 29, 1982

[51] Int. Cl.³ .......................................... B23K 11/24
[52] U.S. Cl. ................... 219/110; 219/117.1
[58] Field of Search ............. 219/110, 111, 109, 108, 219/117.1

[56] References Cited

U.S. PATENT DOCUMENTS

| | | |
|---|---|---|
| 2,848,595 | 8/1958 | Van Sciver . |
| 3,335,258 | 8/1967 | Barnhart et al. . |
| 3,345,493 | 10/1967 | Quettel et al. . |
| 3,408,473 | 10/1968 | Gilbert ............................ 219/111 |
| 3,409,755 | 11/1968 | Munro . |
| 3,422,243 | 1/1969 | Meyer . |
| 3,518,399 | 6/1970 | Vanderhelst . |
| 3,573,421 | 4/1971 | Vanderhelst . |
| 3,586,815 | 6/1971 | Eijnsbergen et al. . |
| 3,588,438 | 6/1971 | Vanderhelst . |
| 3,654,424 | 9/1972 | Vanderhelst . |
| 3,774,006 | 11/1973 | Pasquire . |
| 3,899,653 | 8/1975 | Spinnato ............................ 219/111 |
| 4,302,653 | 11/1981 | Denning et al. ................... 219/110 |

Primary Examiner—C. C. Shaw
Attorney, Agent, or Firm—Frank G. McKenzie; Donald G. Harrington

[57] ABSTRACT

A spot weld control senses differences in welding current required to produce an optimum weld by determining the time rate of change of resistance during the increasing resistance portion of the weld cycle. The weld control can reduce the welding current if the time rate of resistance change exceeds a maximum value and increase the current if the resistance change is less than a minimum value. The weld current may be terminated when a decrease in resistance from the peak resistance value has reached a predetermined percentage of the peak resistance value or terminated after a predetermined number of current cycles.

12 Claims, 7 Drawing Figures

ADAPTIVE SCHEDULE SELECTIVE WELD CONTROL

BACKGROUND OF THE INVENTION

1. Field of the Invention

This invention relates to a weld control for spot welding workpieces of various metals that relies on the time rate of change of resistance between the welding electrodes. More particularly, the invention pertains to a method for determining shortly after circuit variables have stabilized at the beginning of the welding process the optimum weld current or weld schedule on the basis of the time rate of resistance change.

2. Description of the Prior Art

It is known that in resistance welding of metals there is a discernable change in the electrical resistance of the workpiece as the weld is made. During the first few cycles in which electrical energy is applied to the welding electrodes, the electrical resistance across the electrodes is unstable because it is affected by the conditions of the material surfaces. After this period of instability is passed, the resistance under normal welding conditions gradually rises as the temperature of the workpiece rises until the onset of fusion. Most importantly the resistance reaches a peak value and then falls due to fusion and the indentation of the metal caused by the force applied to the welding electrode.

A spot weld is generated by a dynamic process wherein the metal is melted initially on the axis equidistant from the electrodes and then axially toward the electrodes and radially outward from the axis. The electrodes apply a clamping force to the workpiece which confines the melt. The weld process is stopped by terminating the welding current before the melt exceeds the electrode diameter. Otherwise, an impressive but totally undesirable shower of sparks and hot metal will issue from the weld spot. The magnitude of the weld current and the resistivity of the material of the workpiece determine the speed at which a weld nugget is produced. Metal expulsion that produces the shower of sparks sets one upper limit for the current; however, when weld current is too low, merely lengthening the period during which power is supplied to the electrodes may not produce an acceptable weld nugget. The electrical resistivity of the workpiece is an important factor affecting nugget size for a given weld current. The temperature at which each material enters the plastic range where workpiece indentation begins is another important variable.

The principal factors affecting the quality of a spot weld include the magnitude of the clamping force applied to the electrodes that hold the workpiece in position, the duration of the clamp time, the duration of the period during which electrical energy is applied to the electrodes, the magnitude of the weld current and the duration of the holding time during which force is applied to the electrodes after the current is terminated and the weld is made. These factors are adjusted during testing so that an appropriate weld schedule for a particular thickness and kind of weld material is found to produce an optimum weld in the shortest period of time. There are however other variables whose importance is difficult to access in defining the optimum weld schedule but which certainly have a considerable effect on the quality of the weld produced. For instance, the current shunt path through one or more completed adjacent welds operates to draw current from the location where the weld is being made. In this instance, the indicated weld current is greater than that which is actually applied to the weld spot. Another variable is the increasing diameter of the soft copper electrode that results from the heat and pressure of welding and repeated use. Other variables are line voltage variations, multiple thickness workpieces and the use of materials having different current level requirements. The material properties of the workpiece, particularly its chemical composition, have a pronounced effect on the quality of the weld and cannot be correctly evaluated by adjusting the few variables that are usually measured and used by conventional spot weld controllers.

Adaptive controls have been employed to control the weld process of randomly variable workpiece materials by sensing other variables in the process. For example, the temperature inside the weld nugget is an important indication of weld quality but it cannot be measured directly. The emission of sound produced during welding is susceptible to noise interference but it is not coupled to or a part of the weld process mechanism. Thermal expansion of the workpiece has been used for control but it can not be practically applied in portable welders.

Time-adaptive welding controls that sense the resistance between the electrodes have been used to maintain the application of welding current for an extended period until the resistance of the weld decreases by a predetermined percentage, usually about five to ten percent below its peak value, after which the electrical power is disconnected from the electrodes. Time-adaptive controls of this type are limited when the current is too low to produce a significant rise and drop in resistance. When this condition exists the weld must be stopped at a certain predetermined maximum time but only a very small weld nugget, or none at all, will be produced. Time-adaptive controls work best when ample welding current is applied. Such controls compensate for current shunting, changes in electrode size, some variation in workpiece thickness and minor voltage fluctuations.

Time-adaptive controls are not by themselves sufficient to permit the welding of widely different steel alloys, such as mild steel and phosphorized steel, with the same control setting for the weld current. The operator would have to know the type of material beforehand and change the settings of weld current manually to the appropriate value for the particular workpiece material.

SUMMARY OF THE INVENTION

It is a principal object of this invention to produce a weld control that will assure high quality spot welds by adapting the variables of the welding process that control weld quality, particularly weld current, so as to assure a high production rate with the use of automatic welding equipment.

It is another object of this invention to provide a weld control that can sense differences in welding characteristics presented when workpieces of different materials are supplied to the welder. Thickness variations of the workpiece can be randomly submitted for welding and particular local conditions such as shunting, surface conditions and wear of the welding electrodes can be sensed and accommodated with an optimum welding schedule.

It is an object of this invention to provide a weld control that automatically selects an optimum weld current or schedule of weld current immediately after electrical energy is supplied to the electrode upon sensing the time rate of change of resistance of the workpiece immediately following the period of instability after the application of the first few cycles of electrical energy to the electrodes. Alternately, a cooling period of a few cycles may be scheduled after the initial instability has subsided and before the actual welding process is initiated.

It is another object of this invention to automatically vary the magnitude of weld current supplied to the welding electrodes in response to the time rate of change of resistance across the electrodes sensed in the first few cycles during which electrical energy for welding is supplied to the electrodes. The weld control unit according to this invention is programmed to vary the weld current upon sensing the time rate of change of resistance in the very early stages of the process. The weld control adjusts the magnitude of weld current so that a high quality weld is produced in the shortest possible time.

According to current practice in the art combined with the weld control of this invention, the application of electrical energy to the electrodes may be terminated upon sensing a decrease in resistance across the electrodes following a peak resistance measured across the electrodes.

In realizing these and other objectives this electrical spot welding control method includes locating a metal workpiece between welding electrodes that are supplied with electrical alternating current whose magnitude is sufficient to cause fusion of the workpiece. The time rate of rise of resistance across the electrodes after the current and resistance have stabilized following the application of the electrical power is determined. The time rate of rise of resistance is evaluated as a basis for determining the most suitable welding current. The magnitude of the welding current is changed if necessary to the optimum value. We have found that the optimum welding current produces a change of between two and ten percent in resistance per cycle regardless of the type of material being welded. If no rise in resistance is seen, then the current will be increased by a large step. If a one percent rise is seen, the current will be increased by a lesser amount. If a two percent increase is seen, the current is increased by a small step to speed the welding process. If a five percent rise is seen, no change in the current setting will be made; if a ten to twenty percent rise is seen, the current may be reduced to avoid inconveniently short weld periods. It is unnecessary to know beforehand the kind of material being welded; nevertheless the above-mentioned percentage changes in resistance may be chosen differently for different classes of materials.

DESCRIPTION OF THE PREFERRED EMBODIMENT

The process of resistance welding occurs through the localized melting of a small amount of the workpieces due to the heating caused by the passage of electrical current between the electrodes which hold the workpieces in position. During this process, the current passing through the work and the resistance of the work zone continually change as the material is heated, melts and solidifies. Initially the workpieces are brought into contact under pressure provided by the electrode clamping force. Then welding current, most often 60 Hz A.C., is applied to a circuit that includes the workpiece and the electrodes. The initial resistance may be erratic and high due to the presence of oxide layers and surface films which are poor conductors. When heat is generated, the surface effects dissipate resulting in a sharp decrease in resistance. After the resistance associated with surface contaminates is removed, metal—to—metal contact exits. The steadily increasing temperature causes the resistance to increase as well, as indicated by slopes 10 and 12 in FIGS. 2A and 2B. The resistance reaches a maximum value, 14, 16 shortly before the metal begins to melt. After the maximum resistance value is attained, the melting and growth of the weld nugget causes the resistance to decrease 18, 20 until the weld current is terminated. An indentation caused by the force on the electrodes contributes to the reduction in the resistance.

The high initial resistance associated with resistivity due to surface roughness, oxide layers, surface films, etc. causes an erratic reading of the resistance which must be removed before this parameter can be reliably used in a weld control. In order to hasten the passage of the period during which resistance is unstable, two or three current pulses at low magnitude may be applied to the electrode followed by three or four pulse periods of cooling time during which no weld current is applied but during which the holding force of the electrodes remains applied to the workpiece. Thereafter, the resistance value, R, and its rate of change with time reflect quite accurately the value associated with the workpiece material. This low power heating and cooling period is a modification of the control cycle according to this invention and is only required with metals that are difficult to weld and where surface resistivity causes erratic resistance values in more than the first two cycles of the weld process. It has, however, the added advantage that R is lower and its first derivative with time, $dR/dt$, is greater after the metal has cooled following the conditioning cycles. Thus, greater sensitivity and accuracy is attained although a longer process cycle results.

Figure 3:
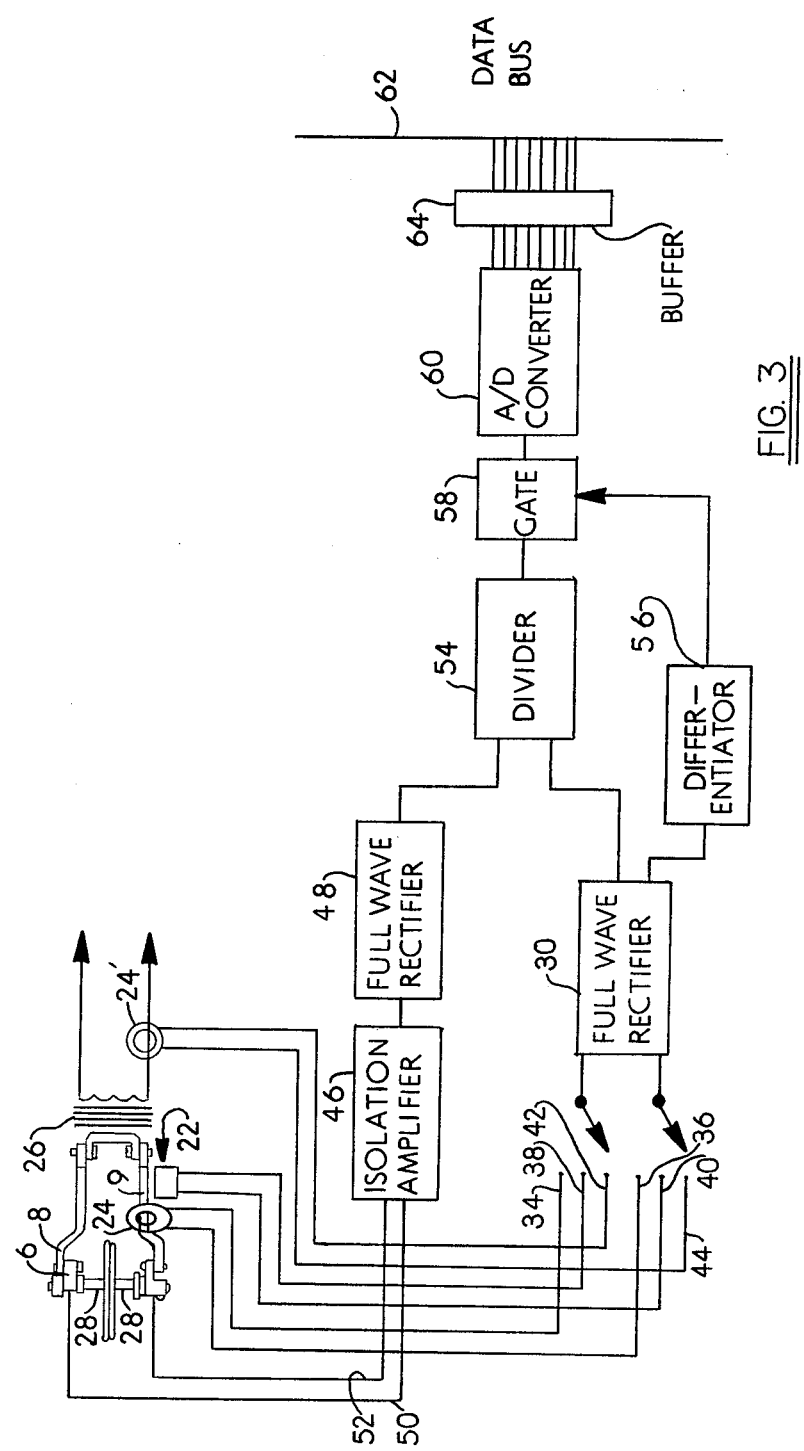
FIG. 3 is a schematic illustration of a circuit for determining cycle by cycle the resistance across the electrodes of a spot welder.

The method according to this invention requires measuring voltage and current values at the workpiece and computing the appropriate resistance values. With reference to FIG. 3, the current seen to be measured by a Hall effect current monitor 22 which is mounted at the weld current inductor near the welder electrodes or by means or a current toroidal transformer 24, 24' connected in the primary or secondary circuit. The monitor or current transformer 26 produces an AC signal whose amplitude reflects the amount of current passing through the electrodes 28. Items 6–9, are the leads and cables connecting the electrodes 28 to the transformer 26. The AC signal is converted to DC signal by a full wave rectifier 30 whose input port is selectively coupled to either of the toroidal transformers 24, 24' or to the Hall effect current monitor 22. The voltage across the electrodes is transmitted to an isolation amplifier 46 which cancels voltage that is not related to the difference in voltage between the wires leading to the Hall generator, by the process of common mode noise rejection. The full wave rectifier 48 converts to DC the AC voltage sensed at or near the electrodes 28 by means of the voltage sensing wires 50 and 52.

The two DC signals representing the weld current and the electrode voltage are supplied to a divider circuit 54, which is adapted to divide the electrode voltage by the weld current. The output of this divider is therefore a DC signal representing the instantaneous resistance of the workpiece for each AC cycle applied, which signal varies as the weld current varies. When the weld current is changing rapidly, as where the current is crossing zero, induced voltages can cause errors; therefore, a differentiator 56 is used to develop a narrow pulse at the top of the sine wave. This pulse is used to control the gate 58 so that the output of the divider is measured at the precise time that induced voltages effects are minimal, namely, when the weld current, I, is minimum and its first derivative with time, $dI/dt$, is zero.

An analog-to-digital converter 60 converts the DC voltage signal representing the resistance to a digital value which is made available to the microprocessor data bus 62 through the buffer 64. The microprocessor will access this data during the execution of those weld instructions that involve resistance feedback.

Figure 2C:
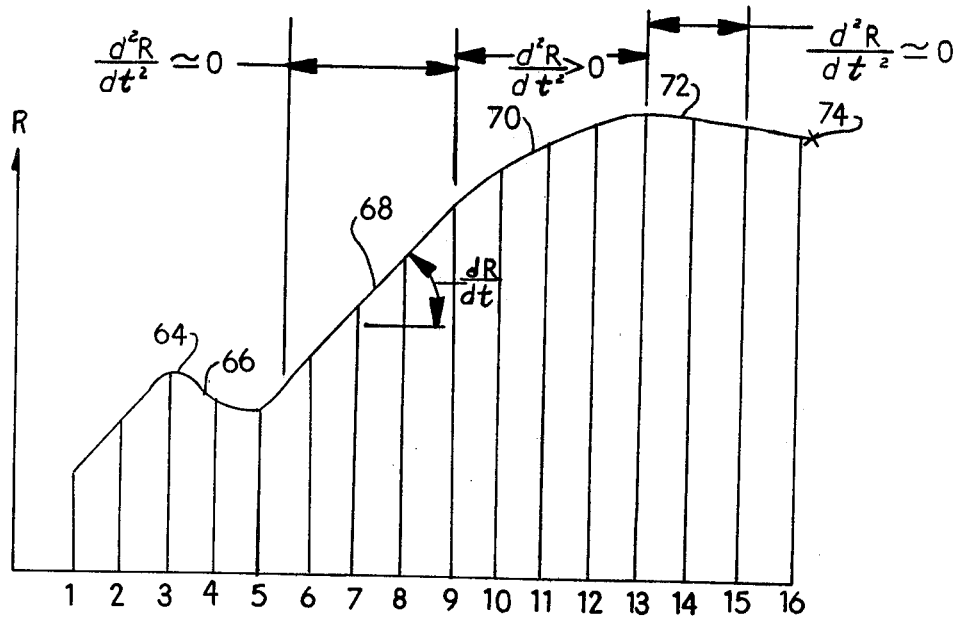
FIG. 2C shows the characteristic resistance variations versus cycles curve for a coated metal such as galvanized steel.
Figure 1A:
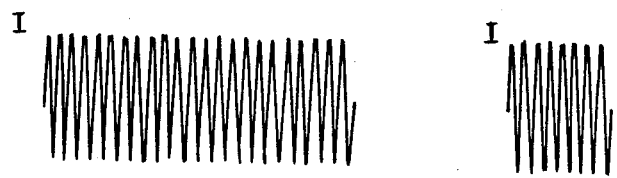
FIGS. 1A and 1B show waveforms representing alternating welding current applied to the electrodes of a spot welder for welding workpieces of low carbon steel and high strength steel, respectively.
Figure 1B:
Figure 2A:
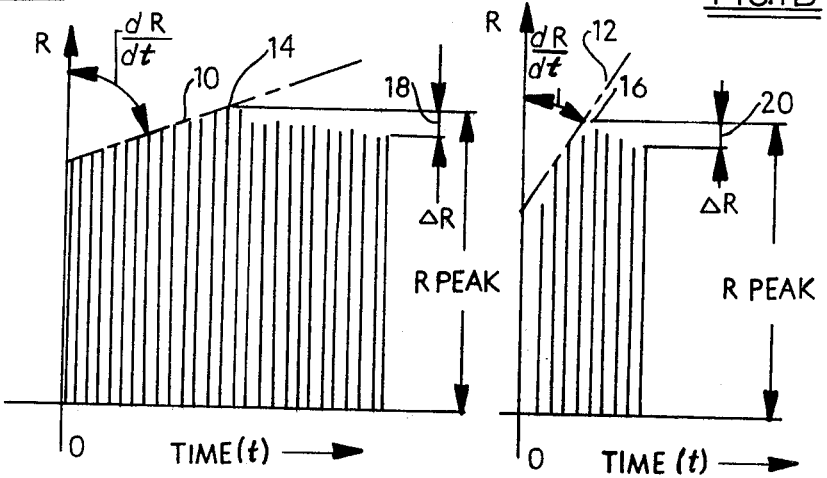
FIGS. 2A and 2B illustrate variations in resistance across the electrodes as the number of energy cycles applied to the welds of FIGS. 1A and 1B accrue.
Figure 2B:
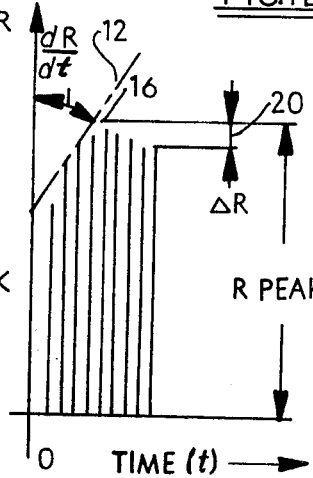

The resistance can therefore be plotted as illustrated in FIGS. 2A and 2B for each weld current cycle when current polarity is either positive or negative. These resistance values correspond to the weld current through the workpiece, whose typical waveforms for low carbon steel and high strength steel are shown in FIGS. 1A and 1B, respectively. The initial increase in resistance is a well known characteristic associated with the increase of resistivity as temperature increases. The decrease in resistance is due to a larger current path cross section between the electrodes and some indentation of the steel by the electrode when the workpiece enters the plastic or molten state.

The rise and fall of resistance has repeatable utility within practical limits as long as only one type of steel is welded and its characteristics are known. But the alloying elements in high strength steel cause an increase in electrical resistivity and a decrease in thermal conductivity; therefore, high strength steel needs much less weld current than low carbon steel. Typically, the welding current for 0.050 inch thick micro-alloy high strengh steel is 10 kA, 13 kA for phosphorized steel and 15 kA for low carbon steel. If the welding current is maintained at the value for high strength steel, then substandard welds or no welds will be produced in a low carbon steel workpiece regardless of the duration of the power cycle because the weld current is too low. This undesirable result becomes more pronounced as workpiece thickness is reduced, particularly below 1 mm. Conversely, if the weld current is set to the value for low carbon steel but the workpiece is of high carbon steel, a violent expulsion of metal will likely occur in the first few cycles.

Heretofore, it was necessary to know the type of material, i.e., whether it was low carbon steel or high strength HSLA steel, in order to set the correct current on the welding machine. This had to be done regardless of whether time-adaptive weld control was used. According to our invention this is no longer necessary.

We have discovered that the time rate of change of resistance during the first few weld cycles following the instability of the resistance waveform can be used as an indication of the optimum weld current that will produce a satisfactory weld regardless of the material of the workpiece. It is no longer necessary to know the type of steel to be welded, the thickness of the workpiece nor the shunting effect of adjacent welds.

For a good spot weld to be completed within a reasonable time, the increase of resistance must occur at a sufficiently fast rate. If the time rate of change of resistance is too low, the weld control according to this invention will increase the weld current in accordance with a table of values relating the optimum weld current to the rise of resistance with time that has been determined empirically. This indicates how far removed from optimum weld current the present current level is.

The welding control of this invention permits different kinds of material to be welded in any order of presentation to the welder. The weld control senses differences in welding current required to produce an optimum weld by determining the time rate of change of resistance, $dR/dt$, 10, 12 during the increasing resistance portion of the weld cycle. The weld control system can also be programmed to reduce the welding current if the time rate of resistance change exceeds a maximum value and to increase the current if the resistance change is less than a minimum value. The weld current may be terminated when a decrease in resistance from the peak resistance value has reached a predetermined percentage of the peak resistance value or it can be terminated after a predetermined number of current cycles.

Figure 4:
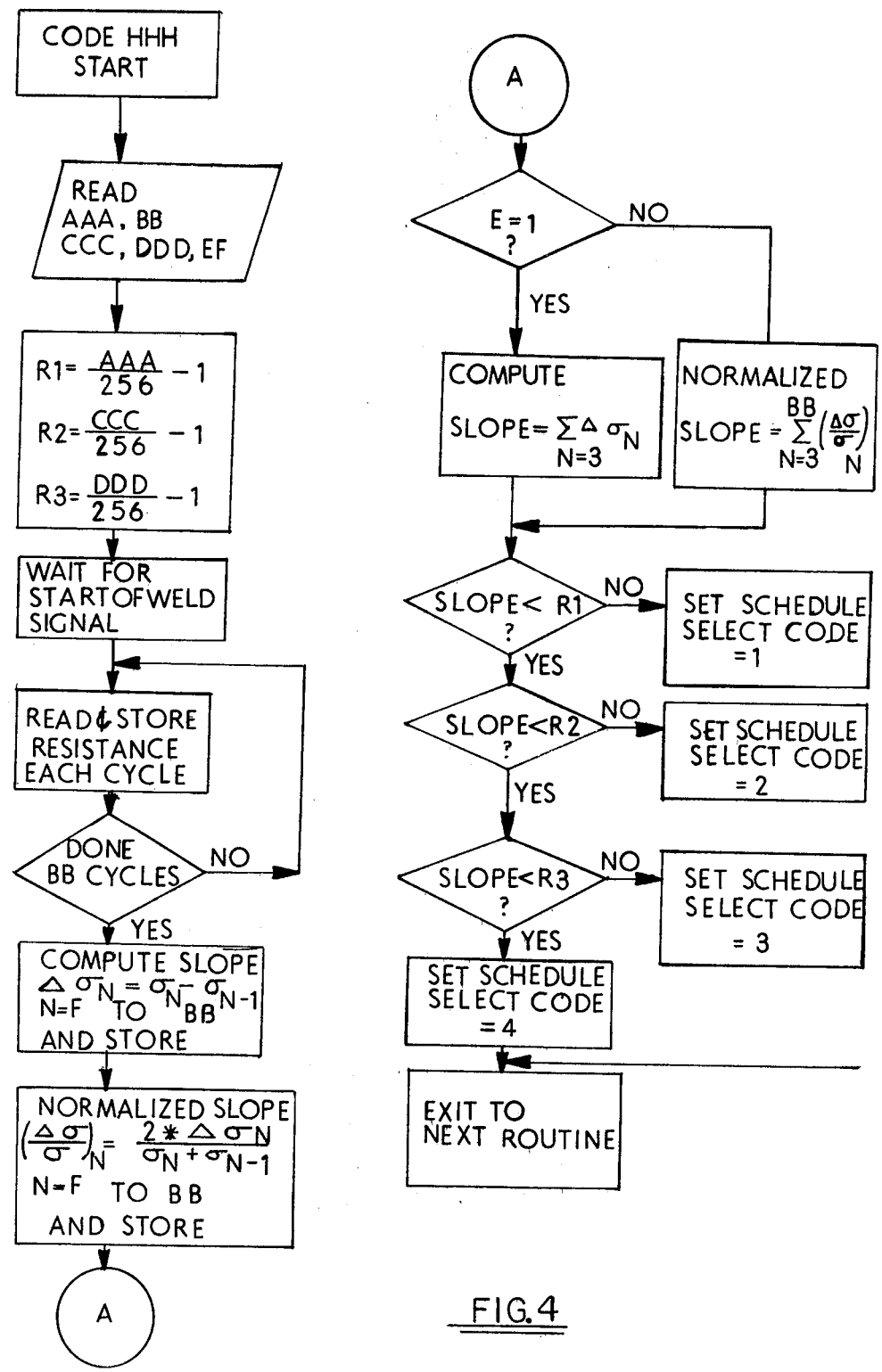
FIG. 4 illustrates a logic flow diagram for use in an adaptive spot weld control employing the principles of this invention.

A strategy by which a resistance feedback weld control according to this invention may be implemented with use of a computer or microprocessor is illustrated in FIG. 4. The flow chart of a computer program for the controller permits three possible ranges of slope for the time rate of resistance change during the period in which this variable is used. The limits defining the slope ranges can be positive or negative. The variables read as input are defined or described functionally as follows:

AAA—maximum slope;
CCC—intermediate slope;
DDD—minimum slope;
BB—the number of weld current cycles during a test heat (the slope or resistance change is measured from heat cycle to cycle BB as described below);
E—a constant that selects either the slope or a normalized slope, $\Delta R/R$, as a reference; and
F—the power cycle number (counting from the first cycle) from which the slope of the resistance curve is computed.

The reference time rate of resistance change values, R1, R2 and R3, are calculated from the slope values set by the program selected by dividing the slope by a convenient constant, e.g., 256, and subtracting unity. These slopes are the reference slopes that are used to select the optimum weld schedule upon comparison to the actual measured slope.

In this process for determining the optimum weld schedule, a 60 Hz weld current is assumed and the schedule selection is made upon comparison with either a normalized slope or an actual slope of the resistance change. Referring again to FIG. 4, after the reference slopes are calculated from the input, the computer calculations are suspended pending the receipt of the start weld signal. Thus, as each power cycle occurs and is incremented in a counter, the resistance between the electrodes and weld current, determined as described with reference to FIGS. 2 and 3, are read and stored. This procedure continues until the counter has incremented to the value BB, the preselected number of power cycles for the test heat. Next, the change of resistance with time is calculated from resistance values corresponding to successive power cycles and these values are stored. The normalized slope, calculated by dividing the change of resistance between successive power cycles by the average change of resistance corresponding to the power cycles from which the resistance change is determined, is calculated and stored for each power cycle.

The value of E is then compared to unity to determine whether the normalized slope or actual slope has been selected as the basis for selecting the weld schedule. If E equals unity, the actual slope of the resistance curve is calculated between the cycle count corresponding to the duration of the test heat, BB, and the cycle count, F, beyond which instability of the resistance and current is within an acceptable range. The computed slope is then tested successively against the reference slopes and the weld schedule is selected once the range of the calculated slope is determined. If normalized slope is used as the basis for selecting the weld schedule, E is not equal to unity and the normalized slope is calculated between the BB cycle count value of resistance and the N cycle value. The computed normalized slope is tested successively against the reference normalized slopes and the weld schedule selected on the basis of the calculated normalized slope range.

When welding coated materials such as galvanized steel, the resistance measured after the above mentioned instabilities in the first two cycles or so have subsided may drop for two or three cycles before it begins to rise. This happens due to an increase in the current path cross section caused by melting of the coating and wetting of the electrodes. In welding such materials, which are easily distinguished visually, the operator can instruct the system to ignore perhaps the first five cycles before starting the schedule selective routine. It is necessary only to increase the input values BB and F by the additional number of cycles. The weld may again be terminated after a fixed number of cycles, or an additional time-adaptive control may be used in one or more of the schedules selected by the schedule selective control of our invention.

It is within the scope of our invention to utilize additional information obtained from the first few weld cycles for selecting the size of the current change. The additional information includes the absolute value of the resistance, R, at the second or third current cycle. Also readily derived is the second derivative of R, $d^2R/dt^2$, calculated from the measured R values of at least three current cycles. A low numerical value for $d^2R/dt^2$ indicates that the R value is near its peak. A low absolute value for R in conjunction with a low value for $dR/dt$ indicates the workpiece material has low resistivity. This set of measured values suggests a very large current increase can be made immediately.

A low absolute initial peak value of R at 64 combined with an initial drop 66 in resistance, i.e., a negative $dR/dt$ as illustrated in FIG. 2C, indicates that the workpiece is galvanized steel. If this set of conditions is sensed, a special schedule for galvanized steel that ignores a fixed number of weld cycles prior to using $dR/dt$ for the weld current setting is selected. Information obtained early in the weld cycle is used to influence the later phases of the weld cycle. In the case of galvanized steel, there may not be a decrease in R, as occurs for bare steel following the period 68 during which R increases. Nevertheless, the completion of an acceptable weld can be determined by considering information obtained from the change of resistance with time curve. For example, referring to FIG. 2C, an indication that the initial rise 68 in resistance has stopped and that the resistance time curve has turned horizontal or nearly horizontal is apparent if $d^2R/dt^2$ increases above zero 70 and thereafter decreases to approximately zero again 72. We have found that the second occurrence 72 of $d^2R/dt^2$ approaching zero indicates the completion of a good weld in the case of galvanized steel. The weld current can be terminated 74 after perhaps two current cycles following the cycle in which $d^2R/dt^2$ attains a near-zero value the second time, provided there is a period 72 between these in which $d^2R/dt^2$ is substantially greater than zero.

Having described the preferred embodiment of our invention, what we claim and desire to secure by U.S. Letters Patent is:

1. A method for welding a workpiece located between electrodes comprising:
   supplying alternating welding current to the electrodes;
   determining the time rate of rise of resistance across the electrodes during the first several cycles of welding current in which the resistance increases steadily that are supplied immediately following the first few cycles of welding current during which the resistance changes unstably and without a steady trend; and
   increasing the magnitude of the welding current if the time rate of resistance rise is less than a preselected rate or reducing the magnitude of the welding current if the time rate of resistance rise is greater than a preselected rate.

2. The method of claim 1 further comprising:
   continuously determining the time rate of resistance change occurring between successive welding current cycles; and
   increasing the magnitude of the welding current if the most recently determined time rate of resistance rise is less than a preselected minimum rate or decreasing the magnitude of the welding current if the most recently determined time of resistance rise is greater than a preselected maximum rate.

3. The method of claim 2 further comprising discontinuing the supply of electric current to the electrodes if the resistance has decreased by a predetermined magnitude from the maximum resistance attained after the weld has begun to form.

4. The method of claim 1 further comprising discontinuing the supply of electric current to the electrodes if the resistance has decreased by a predetermined magnitude from the maximum resistance attained after the weld has begun to form.

5. The method of claim 1 wherein the time rate of resistance change is determined from the resistance across the electrodes when the time rate of weld current change is substantially zero.

6. A method for making electrical resistance welds using a spot welder having electrodes and a controllable electrical welding current supplied to the electrodes comprising:
   inserting the workpiece between the electrodes;
   supplying alternating welding current to the electrodes;
   determining the time rate of increase of resistance across the electrodes during each of the first several cycles of welding current in which the resistance increases steadily that are supplied immediately following the first few cycles of welding current supplied to the electrodes in which the resistance changes unstably and without a steady trend; and
   increasing the magnitude of welding current by an amount that varies with the difference between the determined time rate of resistance increase and a preselected rate if the determined time rate of resistance rise is less than the preselected rate, or reducing the magnitude of welding current by an amount that varies with the difference between the determined time rate of resistance increase and the preselected rate if the determined time rate of resistance increase is greater than the preselected rate.

7. The method of claim 6 further comprising discontinuing the supply of electric current to the electrodes if the resistance has decreased by a predetermined magnitude from the maximum resistance attained after the weld has begun to form.

8. The method of claim 6 wherein the magnitude of the welding current is continuously increased or decreased after each cycle of weld current during which the time rate of increase of resistance across the electrodes is determined.

9. A method for welding a workpiece located between electrodes comprising:
   supplying alternating welding current to the electrodes;
   determining the time rate of rise of resistance across the electrodes after the resistance has stabilized;
   increasing the magnitude of the welding current if the time rate of resistance rise is less than a preselected rate or reducing the magnitude of the welding current if the time rate of resistance rise is greater than a preselected rate;
   supplying a few cycles of low magnitude current to the electrodes before current at welding magnitude is supplied; and
   discontinuing the supply of current to the electrodes for a period of several power cycles while maintaining the workpiece in location between the electrodes and before current at welding magnitude is supplied.

10. A method for welding a workpiece located between electrodes comprising:
    supplying alternating welding current to the electrodes;
    continuously determining the time rate of resistance change across the electrodes occurring between successive welding current cycles;
    increasing the magnitude of the welding current if the time rate of resistance rise is less than a preselected minimum rate or decreasing the magnitude of the welding current if the most recently determined time of resistance rise is greater than a preselected maximum rate;
    supplying a few cycles of low magnitude current to the electrodes before current at welding magnitude is supplied; and
    discontinuing the supply of current to the electrodes for a period of several power cycles while maintaining the workpiece in location between the electrodes and before current at welding magnitude is supplied.

11. A method for welding a workpiece located between electrodes comprising:
    supplying alternating welding current to the electrodes;
    determining the time rate of rise of resistance across the electrodes after the resistance has stabilized;
    increasing the magnitude of the welding current if the time rate of resistance rise is less than a preselected rate or reducing the magnitude of the welding current if the time rate of resistance rise is greater than a preselected rate; and
    discontinuing the supply of electric current to the electrodes if the rate of change of the time rate of resistance rise twice becomes substantially zero after the resistance has stabilized, provided said rate of change becomes substantially other than zero during a period occurring between the periods when said rate of change is substantially zero.

12. A method for welding a workpiece located between electrodes comprising:
    supplying alternating welding current to the electrodes;
    determining the time rate of rise of resistance across the electrodes after the resistance has stabilized and while the time rate of weld current change is substantially zero;
    increasing the magnitude of the welding current if the time rate of resistance rise is less than a preselected rate or reducing the magnitude of the welding current if the time rate of resistance rise is greater than a preselected rate; and
    discontinuing the supply of electric current to the electrodes if the rate of change of the time rate of resistance rise twice becomes substantially zero after the resistance has stabilized, provided said rate of change becomes substantially other than zero during a period occurring between the periods when said rate of change is substantially zero.

* * * * *